Patented Sept. 7, 1954

2,688,610

UNITED STATES PATENT OFFICE 2,688,610

IMIDE DERIVATIVES OF PROTEINS AND THEIR PREPARATION

Herbert S. Elins and John W. Gates, Jr., Rochester, N. Y., assignors to Eastman Kodak Company, Rochester, N. Y., a corporation of New Jersey No Drawing. Application September 26, 1952, Serial No. 311,782

8 Claims. (Cl. 260—117)

This invention relates to preparing derivatives of proteins particularly gelatin by reacting the portein with a cyclic organic imide.

Proteins, in general, and gelatin, in particular, have been known for several decades and many applications have been found for these materials making use of either their solubility characteristics, their possession of an iso-electric point or their water swelling characteristics. These materials vary as to the degree to which they are susceptible to the action of water, which susceptibility is influenced by their purity, the method by which they were prepared and their chemical make-up. It has sometimes been desirable to alter the characteristics of gelatin, for instance, by some treatment thereof which may be chemical in nature.

One object of our invention is to prepare protein derivatives. Another object of our invention is to prepare protein compounds having different characteristics than either of the compounds employed in their preparation. A further object of our invention is to prepare new compounds from proteins and cyclic organic imides. Other objects of our invention will appear herein.

We have found that the reaction products of proteins with cyclic organic imides exhibit unique characteristics as regards viscosities, swelling characteristics, water solubilities and isoelectric points.

We have found that derivatives of proteins may be prepared by reacting the same with cyclic organic imides as represented by the following equation:

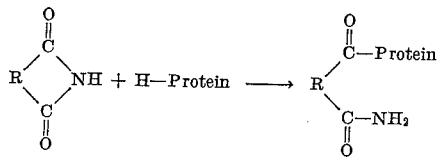

R being an alkylene or aryl group. Some of the proteins which may be reacted with these imides are casein, gelatin, egg albumin and soy bean protein. The reaction is carried out at an alkaline pH such as 8–12 and preferably at a pH of 9–11 and at a temperature of 30–50° C. The reaction is most conveniently carried out in an aqueous dispersion such as in water-acetone, water-dioxane, water-formamide or the like or in water alone. The derivatives obtained are identified by characteristic physical and chemical properties which differentiate them from the original protein which has been reacted upon.

In the course of the reaction it may be desirable to add alkali from time to time to maintain the pH fairly constant. After the reaction has been completed it is desirable in recovering the gelatin compound to neutralize the mass with acid, set the same by cooling and wash the same free of salts such as with cold water. Drying then may be carried out without any further washing operation. In the case of the derivatives of other proteins than gelatin purification may be carried out such as by osmosis or any other refining method desired by the individual operator. The protein derivatives in accordance with our invention may be prepared by reacting the protein with any imide corresponding to the structural formula given. However, the most common imides are phthalimide and succinimide. The following examples illustrate our invention.

Example 1

A solution of 279 parts of gelatin in 3000 parts of water at a temperature of 40° C. and a pH of 9.5 was mixed rapidly with a warm solution of 21 parts of phthalimide in dioxane. The initial temperature and pH were maintained, the mixture being stirred for two hours after the addition of the reactant. The mass was then chilled and noodled and the noodles were washed for five hours. The noodles were then melted, acidified to a pH of 6, filtered and dried to yield 27 parts of gelatine derivative. The iso-electric point of the phthalimide derivative of gelatin was 4.4 as compared to the iso-electric point of the gelatin starting material of 4.95.

Example 2

279 parts of gelatin was dispersed in 2700 parts of water at a temperature of 40–45° C. and a pH of 9.5–9.7. There was then added to the mass 21 parts of powdered succinimide and the initial temperature and pH was maintained during this addition and for 20 minutes thereafter, accompanied by agitation. The mixture was then chilled and noodled and the noodles were washed and worked up in the usual manner to yield 253 parts of product having in iso-electric point of 4.4 as compared to the iso-electric point of 4.95 of the original gelatin.

The gelatin derivatives of our invention are generally useful in capacities in which gelatin has previously been used but in addition many different properties are found. The gelatin derivatives prepared as described may be employed in lithographic printing processes, as a vehicle for silver halide emulsions or in imbibition processes in photography. These gelatin derivatives are useful as peptizing agents, in preparing silver halides in dispersed form as disclosed in application Serial No. 768,475, now Patent No. 2,614,928, of Yutzy and Frame. For instance, if silver nitrate and alkali metal halide are reacted together in an aqueous solution of a gelatin derivative made in accordance with our invention, the silver halide grains formed are uniformly dispersed so as to render the resulting material useful for the preparation of photographic products.

We claim:

1. A method of preparing a gelatin derivative which comprises reacting gelatin with phthalimide at a pH within the range 9–11 at a temperature of 30–50° C.

2. A method of preparing a gelatin derivative which comprises reacting gelatin with succinimide at a pH within the range 9–11 at a temperature of 30–50° C.

3. The gelatin derivative which results from the reaction at a pH of 8–12 and a temperature of 30–50° C. of gelatin with an imide having the structural formula:

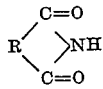

R being selected from the group consisting of alkylene and arylene.

4. The gelatin derivative which results from the reaction of gelatin with phthalimide at a pH of 8–12 and a temperature of 30–50° C.

5. The gelatin derivative which results from the reaction of gelatin with succinimide at a pH of 8–12 and a temperature of 30–50° C.

6. A method of preparing a protein derivative which comprises reacting at a pH of 8–12 and a temperature of 30–50° C. upon a protein with an imide having the structural formula:

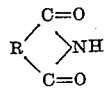

R being selected from the group consisting of alkylene and arylene.

7. A method of preparing a protein derivative which comprises reacting at a pH of 9–11 and a temperature of 30–50° C. upon a protein with an imide having the structural formula:

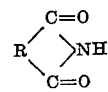

R being selected from the group consisting of alkylene and arylene.

8. A method of preparing a gelatin derivative which comprises reacting at a pH of 8–12 and a temperature of 30–50° C. gelatin with an imide having the structural formula:

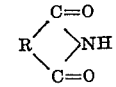

R being selected from the group consisting of alkylene and arylene.

References Cited in the file of this patent

UNITED STATES PATENTS

| Number | Name | Date |
| --- | --- | --- |
| 2,377,885 | Huppert | June 12, 1945 |
| 2,452,315 | Morgan | Oct. 26, 1948 |
| 2,481,540 | Russell | Sept. 13, 1949 |